United States Patent [19]

Elmer

[11] 3,930,821

[45] Jan. 6, 1976

[54] PROCESS FOR MAKING CARBON-CONTAINING GLASS RESISTORS

[75] Inventor: Thomas H. Elmer, Corning, N.Y.

[73] Assignee: Corning Glass Works, Corning, N.Y.

[22] Filed: Jan. 27, 1975

[21] Appl. No.: 544,287

[52] U.S. Cl. ........................ 65/32; 65/60; 427/101; 427/122; 427/228; 428/426

[51] Int. Cl.$^2$ ...................... C03C 15/00; C03C 7/00

[58] Field of Search ........ 65/32, 30 R, 60; 427/101, 427/122, 228; 428/426

[56] References Cited

UNITED STATES PATENTS

| | | | |
|---|---|---|---|
| 3,378,431 | 4/1968 | Smith et al. | 65/32 X |
| 3,390,452 | 7/1968 | Huang | 65/32 X |
| 3,628,984 | 12/1971 | Ishikawa et al. | 428/228 |
| 3,632,385 | 1/1972 | Schmitt et al. | 427/228 |
| 3,640,906 | 2/1972 | Wojcik | 65/30 R X |
| 3,775,078 | 11/1973 | Elmer et al. | 65/32 |
| 3,810,780 | 5/1974 | Ardary et al. | 427/228 |
| 3,813,232 | 5/1974 | Forker, Jr. et al. | 65/32 X |

*Primary Examiner*—S. Leon Bashore
*Assistant Examiner*—Frank W. Miga
*Attorney, Agent, or Firm*—Kees van der Sterre; Clinton S. Janes, Jr.; Clarence R. Patty, Jr.

[57] ABSTRACT

An improved process for the production of carbon-containing glass resistors comprising impregnating porous glass with a furfuryl alcohol solution, polymerizing the furfuryl alcohol retained in the glass by contacting the glass with hydrochloric acid to produce a resin, drying the glass to remove moisture therefrom, and firing the glass in a non-oxidizing atmosphere to convert the resin to carbon, is described. Substantially improved yields of high value resistors are obtained by the process.

6 Claims, 1 Drawing Figure

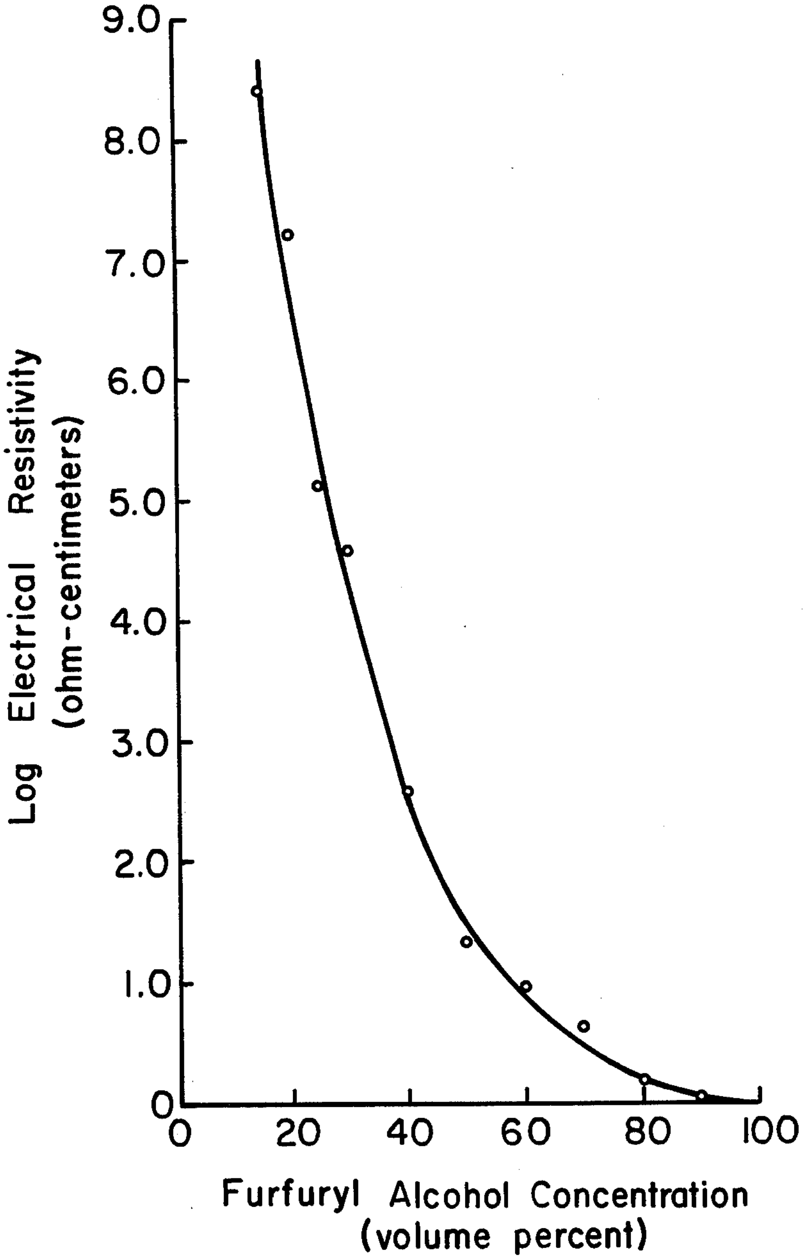
9.0
8.0
7.0
6.0
5.0
4.0
3.0
2.0
1.0
0
Log Electrical Resistivity
(ohm-centimeters)
0
20
40
60
80
100
Furfuryl Alcohol Concentration
(volume percent)

PROCESS FOR MAKING CARBON-CONTAINING GLASS RESISTORS

BACKGROUND OF THE INVENTION

Processes for carbon-impregnating glasses in order to impart electrical conductivity thereto are known. U.S. Pat. No. 2,556,616, for example, describes the impregnation of porous glasses with soluble carbohydrates, particularly sugars, followed by drying and firing to convert the sugars to a continuous conductive carbon phase. Problems attending the use of sugar solutions for this purpose include those relating to the high viscosity and low stability of the solutions, and to the difficulty of obtaining uniform and reproducible carbonization of the sugar impregnant on firing the impregnated glass.

U.S. Pat. No. 3,813,232 describes a method of providing conductive porous glasses which comprises impregnating the porous glass with acetophenone and sulfuric acid, and thereafter heating the impregnated glass to decompose the impregnants and provide a conductive carbon phase in the glass. Disadvantages of this process include the hazards associated with the handling of hot (100°C.) organic and sulfuric acid solutions, and the evolution of copious amounts of noxious sulfur-containing compounds from the glass on heating.

A more convenient method of providing a continuous carbon phase in a porous glass comprises the use of polymerizable furan derivatives as impregnants for this purpose. U.S. Pat. NO. 3,775,078 describes the production of carbon-containing porous glasses exhibiting increased refractoriness and also electrical conductivity, by impregnating a porous 96% silica glass with a solution of furfuryl alcohol in a suitable solvent, polymerizing the furfuryl alcohol in situ in the pores of the glass to provide a resin, and firing the glass in a non-oxidizing atmosphere to convert the resin to carbon.

In attempting to adapt the furfuryl alcohol method to the production of electrical resistance elements, serious difficulties were encountered in obtaining reproducible resistance values, even among resistors processed in the same lot or taken from the same section of resistor cane stock. It was recognized that a broad range of resistance characteristics, including room temperature DC resistivities ranging from about $10^{0.01}$–$10^{10}$ ohm centimeters, could be obtained in the product by controlling the amount of furfuryl alcohol and thus the amount of carbon introduced into the pore structure of the glass. However, considerable variations in resistivity were observed, particularly in the higher resistivity range of about $10^{1.5}$ – $10^{10}$ ohm centimeters, despite attempts to reduce these variations through careful control of glass pore characteristics, temperature, impregnating solution composition, impregnation time, drying schedules, and firing treatments.

It is a principle object of the present invention to provide an improved process for the production of electrical resistive elements using furfuryl alcohol to provide a continuous carbon phase in a porous glass, which permits significantly better control over the resistivity of the product.

It is a further object to provide high resistivity electrical resistance elements produced in accordance with this improved process.

Other objects and advantages of the invention will become apparent from the following description thereof, and from the appended DRAWING which comprises a graph showing the relationship between the electrical resistivity of a carbon-impregnated porous glass produced by impregnation, polymerization, and carbonization of a furfuryl alcohol impregnant and the concentration of furfuryl alcohol present in the solution utilized to impregnate the porous glass.

SUMMARY OF THE INVENTION

Part of the problem of obtaining reproducible resistance values in carbon-containing glasses produced by the furfuryl alcohol process resides in the fact, evidenced by the graph shown in the DRAWING, that resistance is highly dependent on the furfuryl alcohol content of the impregnating solution, particularly in that concentration region where the higher resistivity products (log DC volume resistivity of 1.5–10) are produced. The resistivity of the product is apparently very strongly affected by even minor changes in the carbon content of the glass in this range. Yet it was not understood why wide variations in resistance among samples impregnated with the same solution and having the same processing history were observed. For example, variations in resistivity of as much as a factor of 50 among ¾ inch long resistors cut from a single 3-inch length of resistor cane stock were not uncommon.

I have now discovered that the rate and uniformity of polymerization of the furfuryl alcohol impregnant present in the glass to a resin, prior to firing to obtain conversion to carbon, are important factors affecting the reproducibility of resistance values in carbon-containing glasses produced by this process. I have further found that slow heating rates or heating at moderate temperatures, such as were utilized in the prior art to gradually remove solvents from the glass and polymerize the alcohol, appear to increase the variability of resistance values obtained in the product, for reasons not fully understood. In contrast, I have found that inducing very rapid polymerization of the furfuryl alcohol to a resin by contacting the glass with a concentrated hydrochloric acid solution appears to substantially improve the uniformity of resistance in the product. Thus substantially higher yields of electrical resistance materials having resistivity values within a specified range may be obtained.

DETAILED DESCRIPTION

Porous glasses which are the preferred starting materials for the production of electrical resistors in accordance with the invention are the porous 96 percent silica glasses described by Hood et al in U.S. Pat. No. 2,106,774. These glasses are produced by leaching phase-separated alkali borosilicate glasses to remove the soluble phase, providing a porous glass product comprising a multiplicity of submicroscopic interconnecting pores, the residual glass typically consisting of at least about 94% silica by weight.

Glasses prepared by the process of the aforementioned Hood et al. patent are known in the art by the general designation "96 percent silica glasses," without particular regard for the exact silica content thereof, and this general designation will be used herein with that meaning. Thus this designation is used in the generic sense to include all porous glasses produced in accordance with the above-described method from alkali borosilicate glasses, irrespective of the exact silica content of the porous glass.

The initial step of producing electrical resistors according to the invention comprises conventionally impregnating a suitable glass such as a porous 96 percent silica glass with a furfuryl alcohol solution. Prior to impregnation the glass may be dried to remove mechanically-held water from the pores, if desired. However, drying is not required. Impregnation is typically accomplished by immersing the porous glass in the solution for a length of time at least sufficient to insure thorough penetration by the impregnant into the pore structure of the material. Porous 96 percent silica glasses can normally be fully impregnated within an interval of 24 hours, usually much less, by this procedure.

Solutions of furfuryl alcohol which are useful for this purpose include aqueous solutions and aqueous solutions containing stabilizing agents. Such agents prevent the phase separation on standing which is typical of aqueous furfuryl alcohol solutions of low or moderate concentration. I have discovered that the lower alkanols of one to four carbon atoms per molecule, e.g., methanol, ethanol, propanol and butanol, are particularly useful stabilizing agents for dilute aqueous furfuryl alcohol solutions. Dilute solutions are those comprising about 1-50 percent furfuryl alcohol by volume, which are particularly useful in providing electrical resistance materials with resistivities in the $10^{1.5}$–$10^{10}$ ohm-centimeter range. These alcohols may be utilized in such solutions in amounts ranging, for example, from about 10–50 percent by volume. Preferred solutions consist essentially of furfuryl alcohol, ethanol, and water wherein the ethanol to water ratio ranges up to about 1:1 by volume. Higher concentrations of ethanol may be employed, but are not of significant practical benefit.

Following the impregnation of the porous 96 percent silica glass with an aqueous furfuryl alcohol solution, the furfuryl alcohol is polymerized in situ in the glass to a non-volatile resin, and the glass article containing the polymerized resin is then fired in a non-oxidizing atmosphere to a temperature of at least about 1,200°C. to convert the resin to carbon. This firing treatment, which is conventional, is typically also effective for consolidating the porous glass around the carbon phase, providing an electrically-insulating barrier which additionally protects the carbon phase from oxidation at elevated temperatures during use.

Whereas the firing treatment utilized in converting the resin in the porous glass to carbon may be any suitable thermal treatment utilized for this purpose in the prior art, gradual heat treatments such as were utilized in the prior art to remove solvents from the impregnating furfuryl alcohol solution and to polymerize the residual alcohol to a resin should be avoided. The porous glass impregnated with the furfuryl alcohol solution should instead by contacted with a concentrated aqueous solution (at least about 6 Normal) of hydrochloric acid, as by immersion therein, for a time sufficient to achieve polymerization of the furfuryl alcohol to a resin.

Thereafter the glass is removed from the hydrochloric acid, preferably washed to reduce the concentration of acid in the pores and on the surface thereof, dried to remove moisture from the glass pore structure, and fired in a non-oxidizing atmosphere to a temperature of at least 1,200°C. to convert the resin in the glass to carbon, and to consolidate the glass.

The HCl polymerization method utilized to condense the furfuryl alcohol impregnant to a resin in accordance with the present invention produces substantially higher yields of electrical resistors having resistance values within a specified range than do the heat polymerization methods of the prior art. Also, lower resistivity values from equivalent concentrations of furfuryl alcohol impregnant are obtained. These benefits are attributed to the fact that HCl polymerization is apparently more rapid and efficient than prior art heating methods.

The lower limit on concentration for aqueous HCl solutions utilized to obtain polymerization of the alcohol in situ in the porous glass is established because lesser concentrations are less effective in converting the alcohol to a resin, and permit the escape of small but uncontrollable amounts of alcohol from the pores of glass into the acid solution during immersion. In fact, when acid solutions of a concentration as low as 6 Normal HCl are employed, it is preferred to utilize hot (e.g., 95°C.) acid solutions to further accelerate the polymerization process. However heating is not required, and concentrated room temperature HCl solutions (8–12 Normal) also give extremely rapid polymerization results as evidenced by nearly instantaneous blackening of impregnated glass upon immersion in such solutions.

The time of immersion in acid utilized to obtain polymerization of the alcohol in the glass is not critical, but depends somewhat upon the thickness of the glass and the concentration of the acid employed. Typical immersion treatments range from about 15–60 minutes in duration, with longer times normally providing slightly lower resistivity values for equivalent alcohol impregnant concentrations.

Following polymerization of the alcohol in the glass to a resin, the glass is preferably subjected to a water washing treatment to remove HCl from the pores and surface of the glass. The removal of HCl by washing is preferable to the volatilization thereof which would occur during firing, because of the corrosive nature of HCl fumes. However, the removal of HCl from the pores of the glass by heating is not detrimental to the end properties of the glass.

Washing may be accomplished by the immersion of the glass in water or dilute aqueous solutions. Preferred water washing treatments comprise two separate washing steps in hot (95°C.) distilled $H_2O$, the final wash solution in this two-stage treatment normally having a pH not exceeding about 3 at the end of the treatment.

After washing the glass is dried to remove water from the pore structure thereof and fired in a nonoxidizing atmosphere to a temperature of at least about 1,200°C. to convert the resin to a continuous carbon phase and to consolidate the porous glass. The firing treatment may comprise any suitable treatment utilized for this purpose in the prior art, but preferably involves heating the glass in flowing forming gas (8% $H_2$ + 92% $N_2$) to 1,200°C. or above to achieve full consolidation of the glass around the carbon phase. This consolidation protects the carbon phase from contamination or oxidation in use and thus enhances the stability of the resistance characteristics of the glass.

Drying of the porous glass prior to firing is utilized to gradually remove water from the pore structure of the glass, and may be carried out separately as by heating at moderate temperature (e.g., 80°–150°C.) in an oven. Alternatively, drying may be accomplished in the early stages of the firing treatment by initiating firing at moderate temperatures and utilizing low heating rates in the early stages of the treatment.

The effectiveness of HCl polymerization to provide substantially improved uniformity of resistivity in carbon-containing glass electrical resistance materials produced using the furfuryl alcohol impregnation process is more fully demonstrated by the following illustrative example.

EXAMPLE

Eight three-inch sections of porous glass cane stock, each section having a diameter of 0.07 inches, are selected for treatment. It is desired to make 3 resistors of ¾ inch length, each having a resistance value in the range of about $0.06 \times 10^6$ to $2 \times 10^6$ ohms, from each section of stock.

The eight sections of cane are dried for 1 hour at 150°C. in a hot air oven to remove mechanically held water, and thereafter cooled in a desiccator.

Four of the sections, designated Samples 1, 2, 3 and 4, are then immersed in an impregnating solution consisting of 40 percent furfuryl alcohol, 30 percent ethanol and 30 percent water by volume. After a 2-hour immersion treatment at room temperature, the samples are removed from solution and placed in an oven operating at 80°C. to polymerize the furfuryl alcohol to a resin and remove ethanol and water from the pore structure of the glass. A treatment of 1 hour at this temperature is sufficient to complete the polymerization and solvent removal processes.

Thereafter the samples are fired in a tube furnace to convert the resin in the glass to carbon. The firing comprises heating in a forming gas atmosphere (92% $N_2$ + 8% $H_2$ by volume) at a rate of 100°C. per hour from 160°C. to 1,240°C., holding at 1,240°C. for 15 minutes, and cooling to 600°C. prior to removing from the furnace. This firing also results in consolidation of the porous glass, the linear shrinkage on firing being approximately 10 percent.

Finally the carbon-containing glass sections are cut into three pieces, designated top (T), middle (M), and bottom (B) segments, and each segment is trimmed to ¾ inches in length, discarding small end sections therefrom to provide freshly fractured end surfaces. These end surfaces are then silvered to provide electrical contact with the carbon phase in the glass.

The remaining four sections of porous glass, designated Samples 5, 6, 7 and 8, are impregnated with a furfuryl alcohol impregnant according to the procedure utilized for Samples 1–4, except that a solution consisting of 35 percent furfuryl alcohol, 32.5 percent ethanol, and 32.5 percent water by volume is utilized.

Following impregnation with the furfuryl alcohol solution the samples are wiped and immersed in aqueous 8 Normal HCl at 95°C., being allowed to remain in the acid for 10 minutes. Thereafter the samples are removed, immersed in a first hot distilled water (95°C.) bath for a 10 minute wash, immersed in a second hot distilled water bath for an additional 30 minute wash, and finally dried in an oven at 150°C. to remove mechanically-held water. Polymerization of the furfuryl alcohol to the resin occurs rapidly during the acid immersion step of the above procedure, with substantial polymerization occurring within seconds after immersion as evidenced by rapid darkening of the glass. The 10-minute exposure to acid is more than sufficient to insure substantially complete polymerization of all of the alcohol in the glass.

Following polymerization, rinsing and drying in accordance with the above procedure, the four samples are fired in accordance with the procedure utilized and described above to fire Samples 1–4. They are then cut, trimmed and silvered to provide three resistors from each of Samples 5–8, as described for Samples 1–4.

The following Table sets forth the results of electrical resistance testing of all of the resistors prepared according to the foregoing Example. Included in the Table are the sample numbers (1–8) and locations from within the sample (T, M, B) for each resistor, and the room temperature electrical resistance of each sample in ohms. Reported separately for the group of heat-polymerized resistors from Samples 1–4 and the HCl-polymerized resistors from Samples 5–8 are the percent yield of resistors from each group falling within the target resistance range of $0.06 \times 10^6 - 2 \times 10^6$ ohms. The substantially more uniform resistance characteristics of the HCl-polymerized resistors are evident.

TABLE

| Heat-Polymerized Samples 1–4 | | | HCl-Polymerized Samples 5–8 | | |
|---|---|---|---|---|---|
| Sample Number and Location | | Resistance (ohms) | Sample Number and Location | | Resistance (ohms) |
| 1 | T | $>>10^7$ | 5 | T | $0.21 \times 10^6$ |
| | M | $>10^7$ | | M | $0.23 \times 10^6$ |
| | B | $0.5 \times 10^6$ | | B | $0.17 \times 10^6$ |
| 2 | T | $1.5 \times 10^6$ | 6 | T | $0.15 \times 10^6$ |
| | M | $1.3 \times 10^6$ | | M | $0.15 \times 10^6$ |
| | B | $0.05 \times 10^6$ | | B | $0.15 \times 10^6$ |
| 3 | T | $2 \times 10^7$ | 7 | T | $0.12 \times 10^6$ |
| | M | $>>10^7$ | | M | $0.18 \times 10^6$ |
| | B | $0.6 \times 10^6$ | | B | $0.12 \times 10^6$ |
| 4 | T | $1 \times 10^7$ | 8 | T | $0.13 \times 10^6$ |
| | M | $>2 \times 10^7$ | | M | $0.18 \times 10^6$ |
| | B | $2 \times 10^7$ | | B | $0.12 \times 10^6$ |
| Yield - 33% | | | Yield - 100% | | |

The data set forth in the Table clearly illustrates the utility of the method of the present invention for improving the uniformity of resistivity, and thus the yield, of electrical resistance materials, comprising carbon-containing glasses. Thus the present method permits the attainment of highly reproducible results, particularly in the resistivity range of $10^{1.5} - 10^{10}$ ohm centimeters wherein the achievement of electrical uniformity in furfuryl alcohol-impregnated glasses is difficult.

Although the obtainment of uniform resistance values at lower resistivities, e.g., $10^{0.01} - 10^{1.5}$ ohms centimeters, utilizing furfuryl alcohol impregnation methods is less difficult, the present method offers a further unexpected advantage, even in the preparation of lower resistivity materials, in that lesser concentrations of furfuryl alcohol impregnants are required to produce equivalent resistivities. This is shown in the above Example by the fact that the heat-polymerized resistors which were impregnated with a 40 volume percent furfuryl alcohol solution exhibit generally higher resistances than the HCl-polymerized resistors produced using a 35 volume percent furfuryl alcohol solution.

The improved efficiency and uniformity of HCl polymerization methods in the production of electrical resistance materials by the furfuryl alcohol impregnation of porous glasses has thus been clearly shown.

I claim:

1. An improved process for making a carbon-impregnated glass electrical resistance material which comprises the steps of:

a. impregnating a porous 96% silica glass with an aqueous solution of furfuryl alcohol;
b. contacting the impregnated porous glass with an aqueous solution containing HCl in a concentration of at least about 6 Normal for a time sufficient to polymerize the furfuryl alcohol in the glass to a resin;
c. drying the glass to remove water from the pore structure thereof, and
d. firing the glass in a non-oxidizing atmosphere to a temperature of at least about 1,200°C. to convert the resin in the glass to carbon and to consolidate the porous glass.

2. A process according to claim 1 which further comprises water-washing the impregnated porous glass, subsequent to contacting said glass with the aqueous solution containing HCl, to reduce the concentration of HCl in the porous glass.

3. A process according to claim 1 wherein the aqueous solution of furfuryl alcohol contains a stabilizing agent selected from the group consisting of the lower alkanols of from 1 to 4 carbon atoms per molecule, said stabilizing agent being present in said solution in an amount ranging from about 10–50 percent by volume.

4. A process according to claim 3 wherein said aqueous solution of furfuryl alcohol consists essentially of furfuryl alcohol, ethanol, and water.

5. A process according to claim 1 wherein the aqueous solution containing HCl comprises HCl in a concentration ranging from 8 to 12 Normal.

6. A process according to claim 1 wherein the aqueous solution of HCl is at a temperature of at least about 95°C.

* * * * *